(12) United States Patent
Marrin

(10) Patent No.: US 10,171,903 B2
(45) Date of Patent: Jan. 1, 2019

(54) PORTABLE BINAURAL RECORDING, PROCESSING AND PLAYBACK DEVICE

(71) Applicant: Matthew Marrin, Canyon County, CA (US)

(72) Inventor: Matthew Marrin, Canyon County, CA (US)

( * ) Notice: Subject to any disclaimer, the term of this patent is extended or adjusted under 35 U.S.C. 154(b) by 0 days.

(21) Appl. No.: 15/860,549

(22) Filed: Jan. 2, 2018

(65) Prior Publication Data
US 2018/0139530 A1 May 17, 2018

Related U.S. Application Data

(63) Continuation-in-part of application No. 14/272,635, filed on May 8, 2014, now abandoned.

(51) Int. Cl.
| | |
|---|---|
| H04R 5/02 | (2006.01) |
| H04R 1/10 | (2006.01) |
| H04R 5/027 | (2006.01) |
| H04R 5/033 | (2006.01) |
| H04S 7/00 | (2006.01) |

(Continued)

(52) U.S. Cl.
CPC ........... *H04R 1/1041* (2013.01); *H04R 5/027* (2013.01); *H04R 5/033* (2013.01); *H04S 1/005* (2013.01); *H04S 7/30* (2013.01); *H04S 7/40* (2013.01); *H04N 5/23238* (2013.01); *H04N 5/77* (2013.01);

(Continued)

(58) Field of Classification Search
CPC .......... H04R 1/02; H04R 1/021; H04R 1/028; H04R 1/10; H04R 1/28; H04R 5/033; H04R 3/10; H04M 2001/0204; H04M 1/03; H04S 2420/00; H04S 2420/01; H04S 2420/03; H04S 2420/05; H04S 2420/07; H04S 2420/11; H04S 2420/13; H04S 2400/00–2400/15; H04S 7/00; H04S 7/30; H04S 7/301; H04S 7/302; H04S 7/304; H04S 7/305; H04S 7/306; H04S 7/307; H04S 7/308; H04S 7/40; H04B 1/3838; A41D 13/01; A42B 3/044; A42B 3/0446; A42B 3/0453; F21L 15/14; F21V 21/084; F21V 33/0004; F21V 33/0008;

(Continued)

(56) References Cited

U.S. PATENT DOCUMENTS

| 2007/0186656 A1* | 8/2007 | Goldberg | G01H 3/14 73/647 |
| 2007/0230910 A1* | 10/2007 | Welch | G08C 17/02 386/230 |

(Continued)

OTHER PUBLICATIONS

"TLV320AIC23B Stereo Audio Codec, 8- to 96-kHz, With Integrated Headphone Amplifier", Texas Instruments, Data Manual, Feb. 2004, pp. 1-55.*

*Primary Examiner* — Leshui Zhang
(74) *Attorney, Agent, or Firm* — Mark S Hubert

(57) ABSTRACT

A portable binaural recording and playback device includes headphones with embedded outside facing microphones attached to a dongle with embedded stereo microphone preamplifier or audio codec containing a microphone preamplifier, analog to digital converter/digital to analog converter (or digital signal processor), allowing for the recording and playback of high quality binaural audio by connecting the dongle digitally to a mobile phone or electronics device, or via an analog cable to a camera or device with an analog microphone input.

11 Claims, 12 Drawing Sheets

(51) Int. Cl.
*H04S 1/00* (2006.01)
*H04N 5/77* (2006.01)
*H04N 5/232* (2006.01)
*H04N 13/189* (2018.01)

(52) U.S. Cl.
CPC ........ *H04N 13/189* (2018.05); *H04R 2499/11* (2013.01); *H04S 2400/15* (2013.01)

(58) Field of Classification Search
CPC ........... F21W 2121/06; F21W 2131/20; F21W 2131/202; G08B 5/004
USPC ................ 381/312, 313, 314, 316–331, 309, 381/111–117, 355, 356, 358, 361, 365, 381/366, 367, 374, 375, 385, 387, 395, 381/409, 411, 124, 74, 92, 119, 334; 455/90.3, 566, 575.8, 569.1; 700/94; 362/105

See application file for complete search history.

(56) References Cited

U.S. PATENT DOCUMENTS

| | | | | |
|---|---|---|---|---|
| 2009/0015711 A1* | 1/2009 | Yamamoto | ............. | H04N 7/186 348/441 |
| 2010/0104118 A1* | 4/2010 | Sasidharan | ............ | H04R 5/027 381/309 |
| 2011/0090626 A1* | 4/2011 | Hoellwarth | ....... | B29C 45/14639 361/679.01 |

* cited by examiner

PORTABLE BINAURAL RECORDING, PROCESSING AND PLAYBACK DEVICE

CLAIM FOR DOMESTIC PRIORITY

This application incorporates by reference and is a continuation in part of U.S. patent application Ser. No. 17/715,238 filed May 18, 2015, which incorporates by reference and is a continuation in part of U.S. patent application Ser. No. 14/272,635 filed May 8, 2014

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to consumer electronics, and more particularly to audio system technology for audio analog signal to audio digital signal conversion, digital audio signal processing, audio digital signal recording, audio digital audio signal to audio analog signal conversion and audio playback.

BACKGROUND

Smart phones, tablet computers and similar multimedia computing components have reached an unprecedented level in consumer electronic sales in recent times, achieving a dominating presence in the lives of many. People now use their phones or tablet computers to read books, watch movies or television programs, listen to music, make telephone calls, record activities with portable, mountable camera/video recorders, and/or communicate via voice-over-IP with or without video data. Additionally, people are using smart phones and tablet computers for audio and video recording, from simply recording their own thoughts to recording conversations, business meetings, concerts, or education material such as presentations or podcasts. The accessibility and size of smart phones and tablet computers make them a quick and easy audio and video recording option. Unfortunately, recordings on phones will almost always be monophonic, reliant on the quality of the built-in microphone, creating a less than ideal audio recording.

SUMMARY OF THE INVENTION

In accordance with the invention, headphones with embedded microphones connect to a protective mobile electronic device case which contains an audio and or video codec and an optional battery, allowing for the recording and playback of high quality binaural audio while at the same time acting as a protective case and as an optional, additional power supply. Additionally, for just audio recording and playback, a dongle can house the audio codec or even the headphones themselves and be connected digitally to a smart phone or mobile electronics device.

BRIEF DESCRIPTION OF THE DRAWINGS

FIG. 7 is a perspective view of the case of an alternate embodiment binaural recording and playback accessory for a multimedia device of the present invention with;

DETAILED DESCRIPTION

Figure 9:
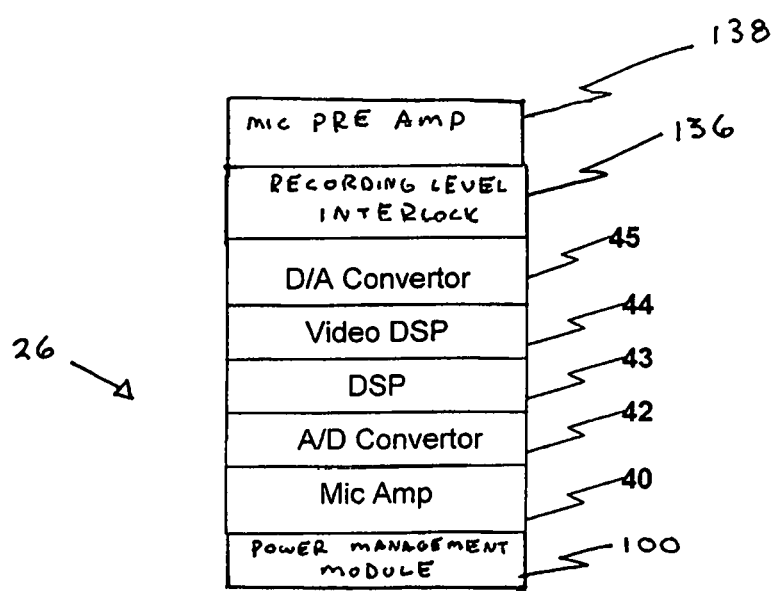
FIG. 9 is a diagram illustrating the possible constituent parts of the audio and audio-visual codec of the present invention.
Figures 10, 11:
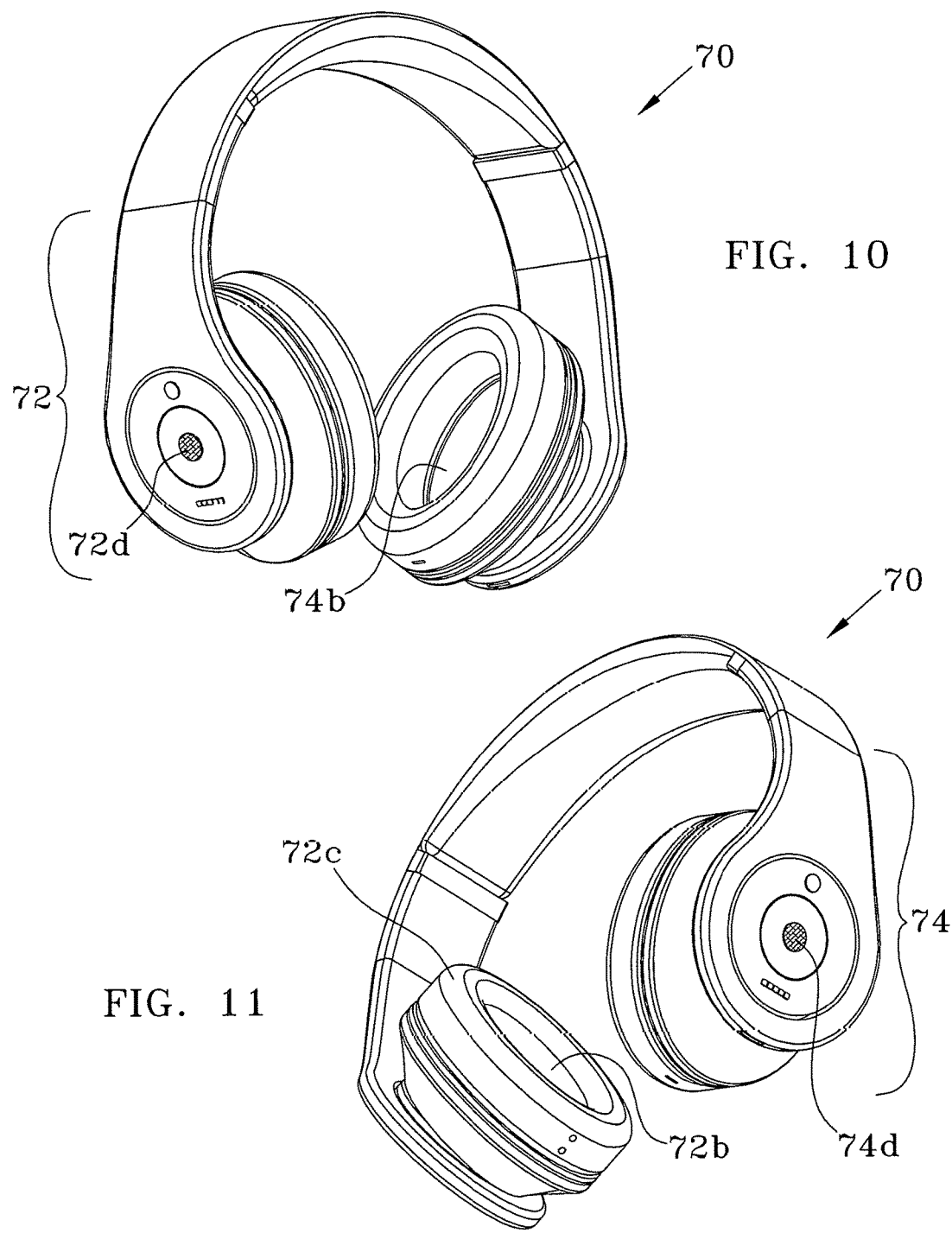
FIG. 10 is a left-side perspective view of binaural recording and playback over-the-ear headphones of the present invention.
FIG. 11 is a right-side perspective view of binaural recording and playback over-the-ear headphones of the present invention.
Figure 12:
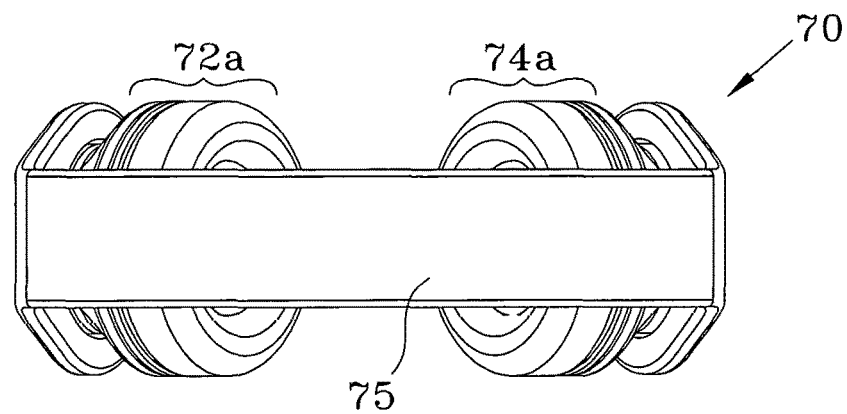
FIG. 12 is a top view of binaural recording and playback over-the-ear headphones of the present invention.
Figure 13:
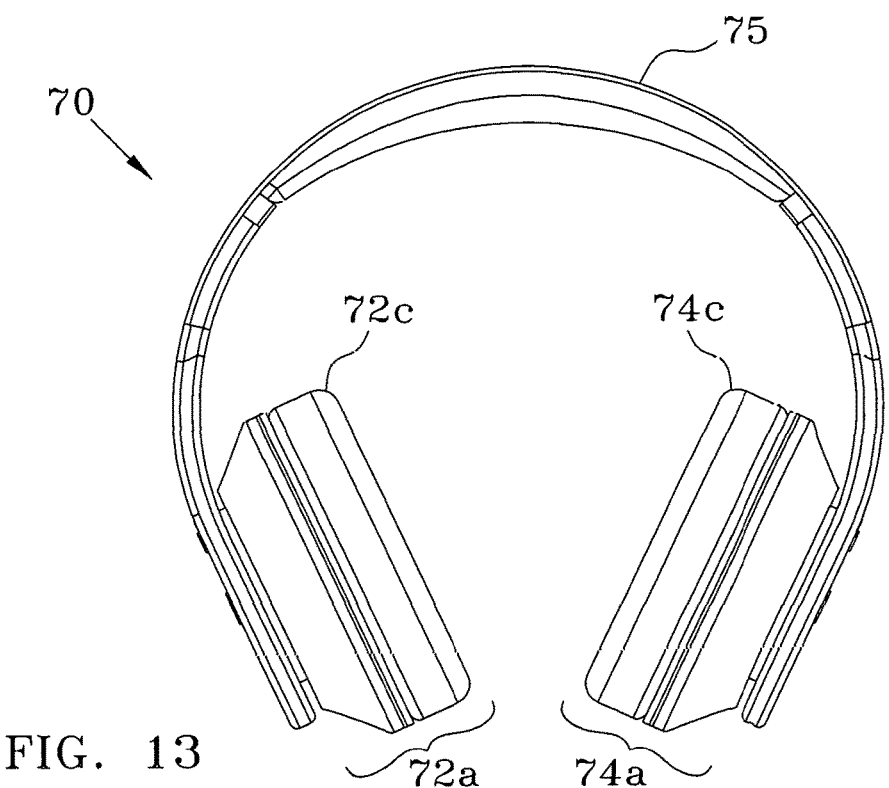
FIG. 13 front view of binaural recording and playback over-the-ear headphones of the present invention.
Figure 14:
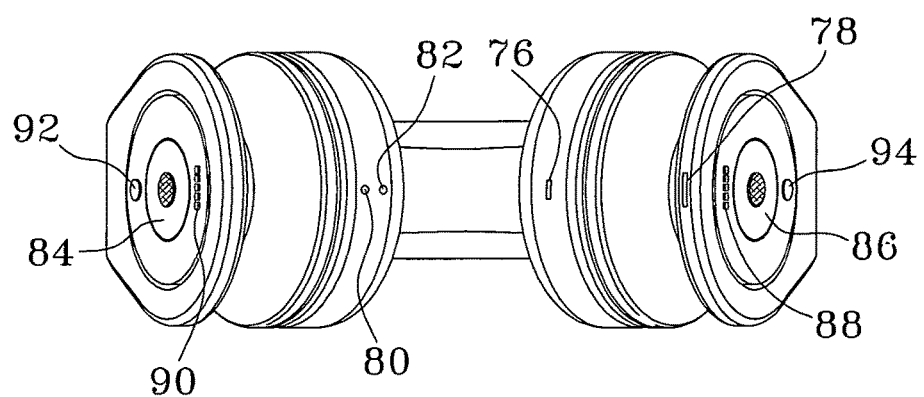
FIG. 14 is a bottom view of binaural recording and playback over-the-ear headphones of the present invention.
Figure 15:
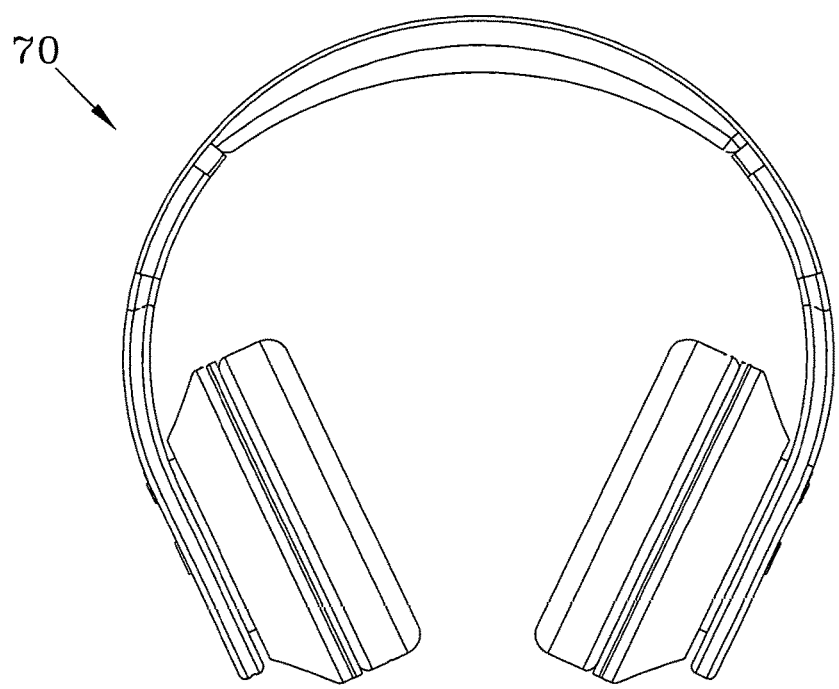
FIG. 15 back view of binaural recording and playback over-the-ear headphones of the present invention.
Figure 16:
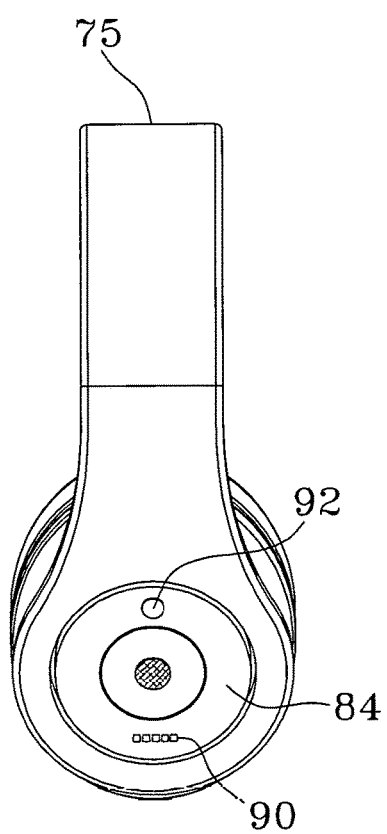
FIG. 16 is a left-side view of binaural recording and playback over-the-ear headphones of the present invention.
Figure 17:
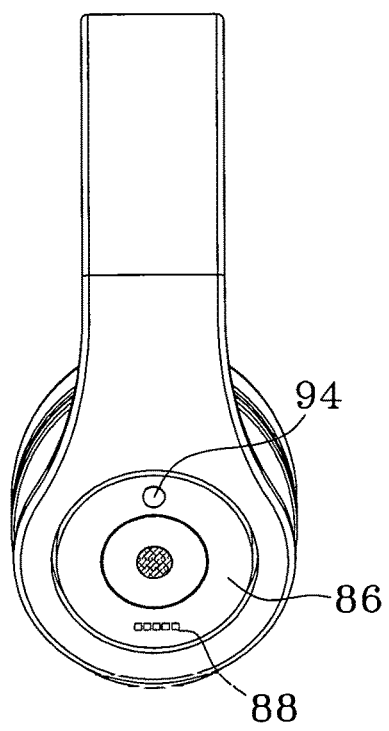
FIG. 17 is a right-side view of binaural recording and playback over-the-ear headphones of the present invention.
Figure 18:
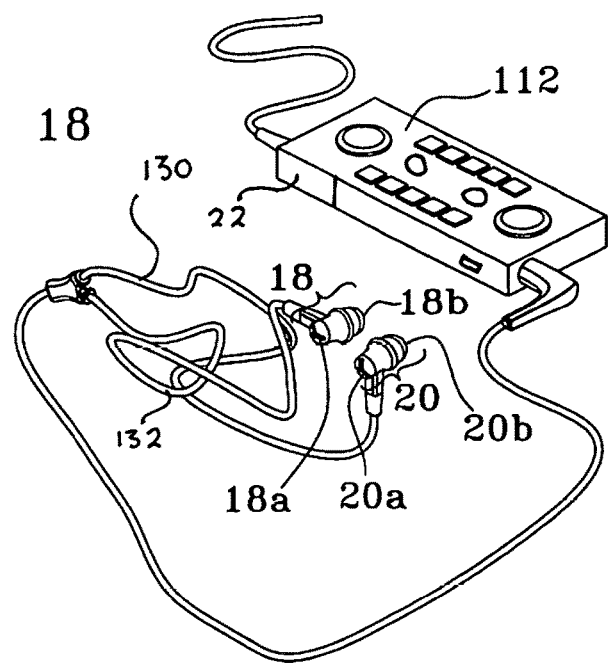
FIG. 18 is a perspective view of the binaural recording and playback dongle of the present invention.
Figure 19:
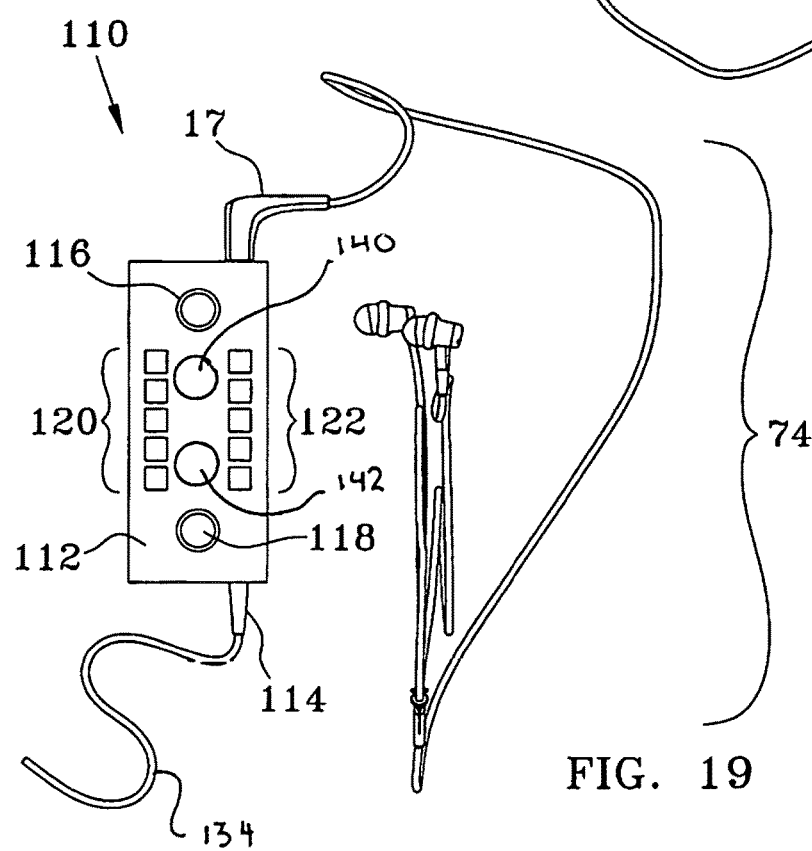
FIG. 19 is a top view of the binaural recording and playback dongle of the present invention.
Figure 20:
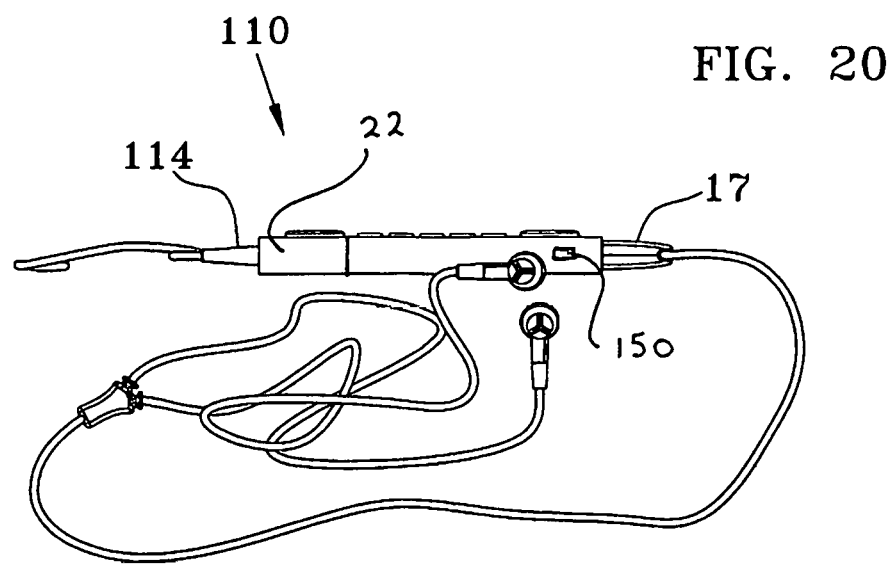
FIG. 20 is a right-side view of the binaural recording and playback dongle of the present invention.
Figure 21:
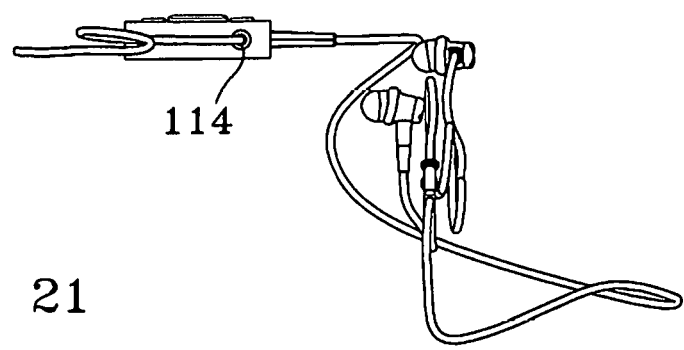
FIG. 21 is front view of the binaural recording and playback dongle of the present invention.

As used herein, the term "codec" refers to hardware, firmware, software, or a combination of hardware, firmware, and software that provides the architecture, which is configurable into a number of functional arrangements to accomplish the audio and or video processing necessary for accessory 10. As illustrated in FIG. 9, codec 26 may include analog microphone/earphone input connectors, microphone amplifiers, analog audio signal to digital audio signal converters (A/D convertor), digital audio signal processors, digital video processors, digital audio signal to analog audio signal converters (D/A convertor) and digital multimedia device connectors. However, in its most basic form, codec 26 employs only a microphone preamp 40 and digital audio convertor 42, as this is all that is needed for the recording of binaural signals.

As used herein, the term "dongle" is a parasitically powered electronic device that is connectable (hard wired or wirelessly) to a multimedia device. The dongle has its own microprocessor and an application program loaded thereon that can be integrated with the operating system of the multimedia device such that certain functionality of any contained software, firmware and hardware in the dongle may be accessed and operated via the video interface of the multimedia device. In the present invention, the dongle is a parasitically powered housing for the codec. The dongle may also have indicating light emitting diodes and tactile buttons for control of certain codec functionality.

As used herein, the term "headphone/s" refers to any physical configuration of stereo speakers intended for use in or around the head and the ear canals. This includes over the ear headphones (circumaural), in the ear speaker buds, partially inserted in the ear speakers, and the equivalent.

As used herein, the terms "inwardly facing and outwardly facing" are taken with reference to the ear canal. Inwardly facing devices accomplish their intended function in a direction aimed towards the ear canal. Outwardly facing devices accomplish their intended function in a direction aimed away from the ear canal.

As used herein, the terms "parasitic power or parasitically powered" refer to a source of power that comes from another powered device rather than from the direct source of the power. In the way of an example, a parasitically powered device would be connected to another device that receives its power from a direct connection to a dedicated power source, such as an electrical outlet or a battery. A dedicated power source supplies electrical power only and performs no other function but to generate and/or distribute power.

Figure 6:
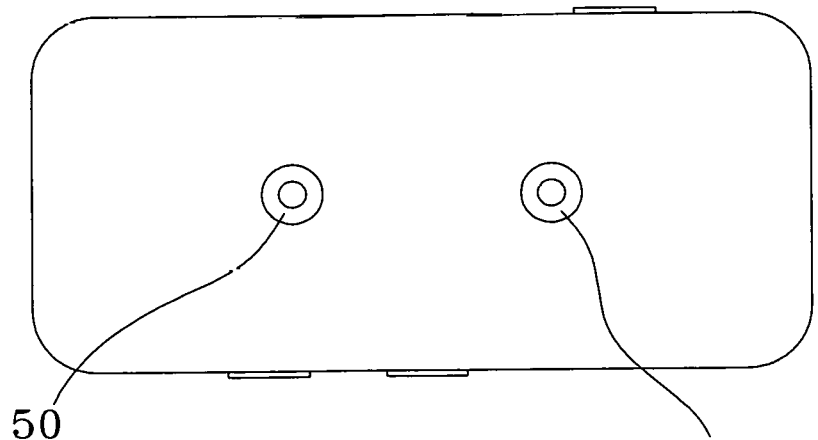
FIG. 6 is a rear view of the case of the binaural recording and playback accessory for a multimedia device of the present invention
Figure 7:
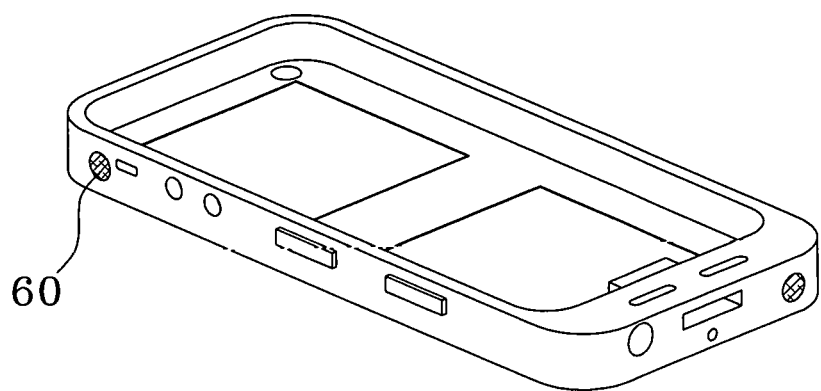
Figure 8:
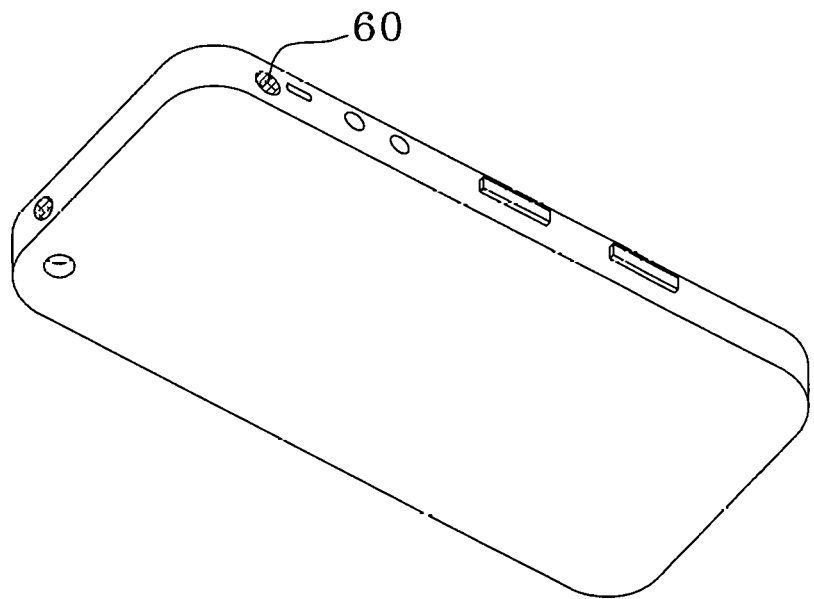
FIG. 8 is a rear-perspective view of the case of an alternate embodiment binaural recording and playback accessory for a multimedia device of the present invention.

The present invention is device for audio analog signal to audio digital signal conversion, digital audio signal processing, audio digital signal recording, audio digital audio signal to audio analog signal conversion and audio playback, with a pair of earphones having embedded, outwardly facing microphones for binaural audio recording that simulates what the user hears and inwardly facing speakers. (FIG. 1) This allows the user to record the audio environment the same as they experienced it firsthand. These microphones spaced at the ears consider the wearer's head size, ear separation, vertical location, angular position, proximity to the sound source, etc. The earphones (FIG. 2) are generally connected to an enclosure or case that houses a multimedia device such as a cell phone (FIGS. 3, 4A, 4B, 4C, 5, 7 and 8) or a dongle (FIGS. 18-21). This case or dongle contains an audio and optional video codec which encompasses hardware, firmware, software (or a combination thereof) incorporated into a microprocessor. (FIG. 9) The multimedia case embodiment has optional batteries. In one alternate multimedia case embodiment, there are dual cameras. (FIG. 6) In another alternate multimedia case embodiment, there are embedded microphones 60 in the sides and ends of case 14, allowing for earphone microphones to be omitted. (FIGS. 7 and 8)

In alternate embodiments, the codec may be incorporated into headphones (FIGS. 10-17), or even downloaded as a software application or series of executable instructions into the multimedia device's memory and operating system.

The codec is configurable into different functional arrangements to accomplish audio signal conversion and audio and/or video signal processing for the multimedia device it is coupled to, allowing for the recording and playback of high quality binaural audio.

At least one battery 22 may or may not be included into the embodiment where the codec is integrated into the multimedia case. When there is a battery, there will be a power management module 100 in the codec.

Figure 1:
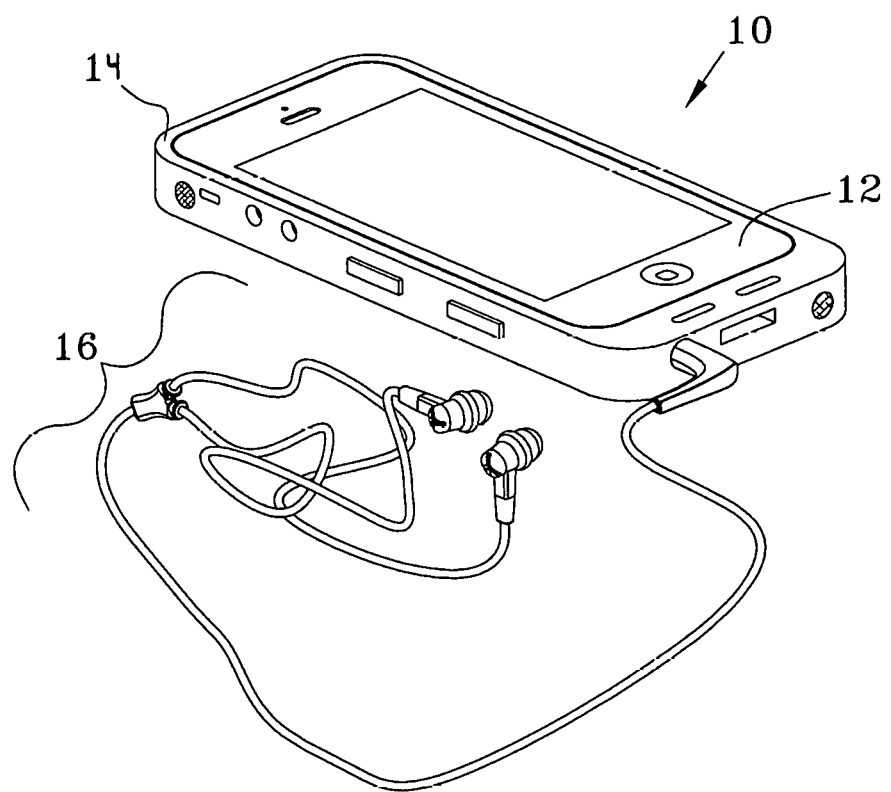
FIG. 1 is a perspective view of the binaural recording and playback accessory for a multimedia device of the present invention in use with a portable electronic device.
Figure 2:
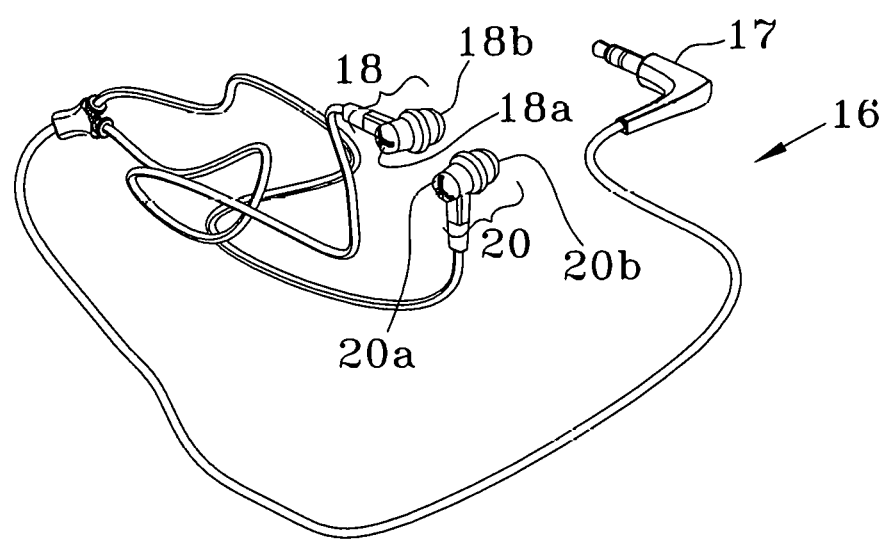
FIG. 2 is a perspective view of the headphones of the present invention.
Figure 3:
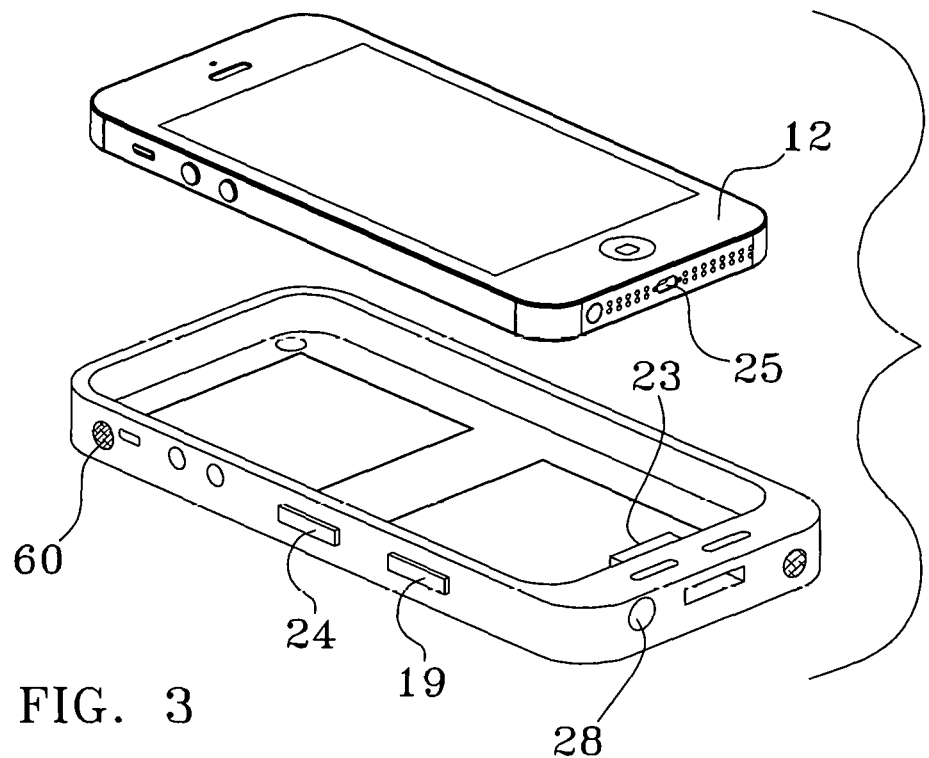
FIG. 3 is an exploded view of the case and portable electronic device of the binaural recording and playback accessory for a multimedia device of the present invention.
Figure 4A:
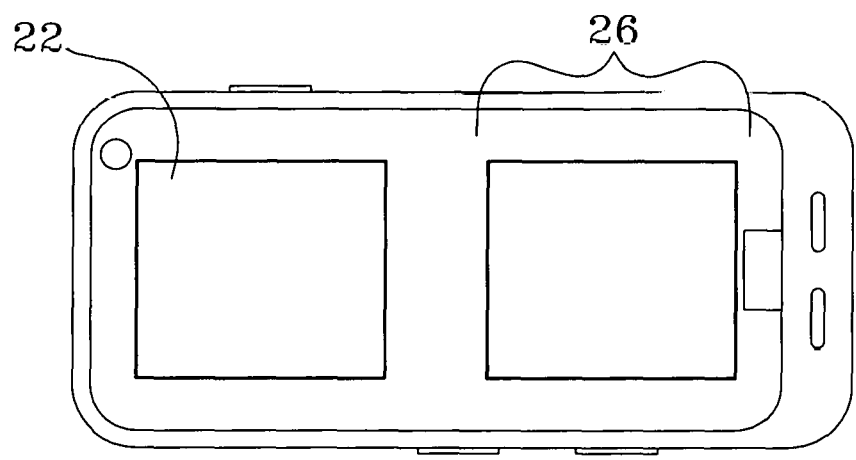
FIG. 4A is a top view of the case of the binaural recording and playback accessory for a multimedia device of the present invention.
Figure 4B:
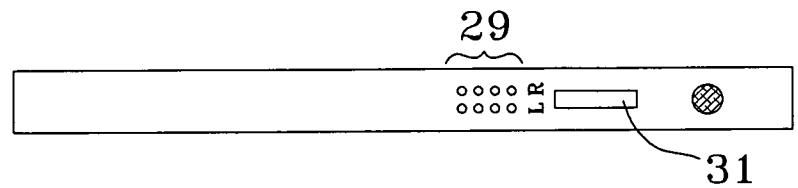
FIG. 4B is a right-side view of the case of the binaural recording and playback accessory for a multimedia device of the present invention.
Figure 4C:
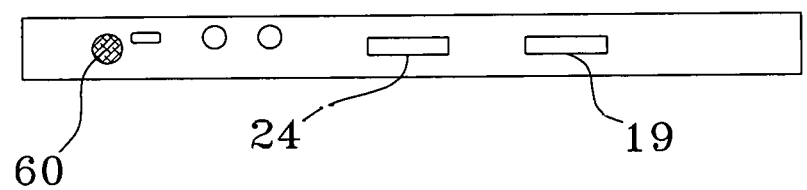
FIG. 4C is a left-side case of the binaural recording and playback accessory for a multimedia device of the present invention.
Figure 5:
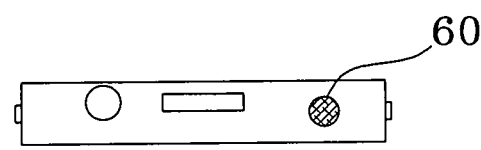
FIG. 5 is a front view of the case of the binaural recording and playback accessory for a multimedia device of the present invention.

FIG. 1-2 illustrates the binaural recording and playback device 10 of the present invention in use with a multimedia device 12. Device 10 comprises case 14 and earphones 16. The earphone assembly 16 comprises a right-ear piece 18, a right earphone speaker 18b, a right-ear piece microphone unit 18a, a left-ear piece 20, a left earphone speaker 20b, and a left-ear piece microphone unit 20a. As illustrated herein earphones 16 are earbud-style earphones; however, circumaural (around-the-ear) audio headphones that are either closed back or open backed could also be used without departing from the scope of the invention (in an open backed design all ambient sound can still be "passed through" to the user concurrently with the audio playing through the speakers).

Microphone units 18a and 20a are powered by "phantom power" or "plugin power" (a minute electrical current passing to the microphone units through at least one of the same conductors that carry the microphone's right and left output signals.) This is possible by utilizing a common negative conductor for both the microphones (18a, 20a) and earphone speakers (18b, 20b).

The hard wiring of the earphones 16 to the case or dongle embodiments would utilize six conductors—three per side. Thus, there is a right, three wire conductors, analog transmission cable 130 connected between said dongle and said right ear piece, wherein said conductor is operatively connected to said right microphone and said right speaker, and a left, three wire conductors, analog transmission cable 132 connected between said dongle and said left ear piece, wherein said conductor is operatively connected to said left microphone and said left speaker;

In the preferred embodiment, jack 17 is of a tip ring sleeve connector style, which is well known in the art. Jack 17 has two different regions (generally stepped in diameter) and an outer sleeve each connected to one of the three hardwires described above (not illustrated). Should an alternate embodiment have an additional microphone for capturing a user's talking (not illustrated) a seventh wire from this microphone would be required and the internal wiring for the connection to the jack 17 would be modified as would be well known in the industry. Microphones 18a, 20a are outward facing (face away from the head of the user) and lie along the centerline of the ear canal, when placed in a user's ear. Microphones 18a, 20a are non-directional, capturing sound from all directions, partially limited only by any physical barriers. Thus, microphones 18a, 20a are positioned to collect the exact same sound that would go into the ear canal as the ear canals would capture without headphones. In this way the sound origin, direction, volume, frequencies, tonal response, etc., as captured by microphones 18a, 20a will most closely approximate the sound collected by the users' ears at the time of a recording, essentially mimicking a Head Related Transfer Function (HRTF). When reproduced, this audio recording will closely mimic the original source (of the audio waves being captured) and coordinate this sound with any video captured from this point (that is the location of the multimedia device 12).

Microphones 18a, 20a are enabled via switch 19 which is mounted on case 14. A visual indicator 29 of the of the respective input and output levels from the microphones 18a, 20a, is also located on case 14 and may comprise a series of LEDs. Recording level control is accomplished via a two-way switch 31, allowing the user to raise or lower the recording level. The switch 31 will be mounted in the case adjacent the visual indicator 29. Since the separate microphones face 180 degrees apart and are blocked by the mass of a human head not all audio recorded by the microphones will have the same volume. There is a stereo low recording level interlock circuit 136 in the codec 26 which contains a set of instructions that requires there be a detected signal from both microphones before stereo recording can be initiated. Additionally, the stronger of the two recording signals must be maintained below a maximum level for recording clarity. Switch 31 will allow both microphone sensitivities to be simultaneously adjusted upward or downward so as to overcome the low recording level interlock feature and insure a proper recording level is maintained as well as the stereo separation of the recorded signals.

Although illustrated as wired, earphones 16, and hence microphones 18a, 20, could easily be enabled for wireless transmission such as Wi-Fi, Bluetooth, 4G including LTE, Wibro Evolution (3.9G), LTE-Advanced, or otherwise enabled for wireless transmission of audio signals. The preferred method of operational connection between the case 14 (or dongle) and the earphones 16 is via an analog signal transmission cable. The preferred method of operational connection between the case (or dongle) and the multimedia device is via a direct plug in with a male multi-pin interface connector 23 on the case that matingly conforms to a female multi-pin interface connector 25 incorporated into the multimedia device 12 The preferred method of operational connection between the case or dongle and the multimedia device is via a digital signal transmission cable.

Case 14 may contain one or more batteries 22 which can be directed to serve in three different ways: as the primary power for the multimedia device, the reserve power for the multimedia device 12, or the primary power source for the codec 26, and earphones 16. There is a power management module 100 in the codec that directs the microprocessor to regulate the flow of electricity to the multimedia device alone, the multimedia device upon drop of multimedia battery power below a preset level, or to the codec components and earphones 16. Switch 24 allows the user to determine which of these three power usage modes of the battery they want the power management module to use. When the power management module directs all power to the multimedia device 12, the codec and earphones 16 draw their operational power parasitically from the connected multimedia device.

The physical structure of the case 14 is variable and may be made water resistant, waterproof, shockproof, and have a smooth or textured surface finish.

Earphone jack input hole 28 is incorporated into case 14 and is adapted to receive earphone jack 17 and is matingly conformed for proper electrical connection with the various six (or seven) conductors of the aforementioned jack 17. Input hole 28 moves electronic signals both ways—by reception and transmission. Transmission in the cases of sound/music being played through the earphones 16 and the phantom power being sent to the microphone units 18a and 20a and reception when microphones 18a, 20a are recording. Case 14 connects to multimedia device 12 via a male multi-pin interface connector 23 that matingly conforms to a female multi-pin interface connector 25 incorporated into the multimedia device 12 and that allows electrical continuity between the multimedia device 12's electronic features, the codec 26, and the earphones 16. It should be noted that male multi-pin interface connector 23 could vary in the case 14 and physical configuration, depending on "style" of the female multi-pin connector 25 of the multi-media device to which it connects. Additionally, earphones 16 could easily be replaced by using an adaptor (connected to case 14 via input hole 28) to connect two external microphones of any type.

There is a series of hard wired connections between the male multi-pin interface connector 23, the codec 26 and the earphones 16. It is to be noted that input hole 28 in case 14 is hard wired for electrical contact to both the codec 26 and the male multi-pin interface connector 23. This allows a plethora of different operations. It is to be noted that the earphone jack input hole of the multimedia device 12 is not utilized with device, rather it is replaced with the earphone jack input hole 28 which is wired to the codec 26 and the male multi-pin interface connector. If the multimedia device's earphone jack input hole was used, then there would be no way to route any of the microphone's output to the codec 26 for processing. In this way, the input signal from the microphones 18a, 20a is always processed first by codec 26 prior to being transmitted to device 12, while the output signal from device 12 passes through codec 26 prior to being transmitted to headphones 16.

Case 14 may include two embedded cameras 50, 52 adapted for stereoscopic or 360-degree video recording. This may be accomplished with special camera lenses and/or camera placement of the case 14. In such an embodiment codec 26 would receive the two separate video signals from the cameras 50, 52 and process them appropriately for enhanced stereoscopic or 360 video recording and playback via multimedia device 12. In this embodiment, the initiation of a video recording by the multimedia device 12 would not operate the multimedia device's local camera but rather, initiate operation of the two stereoscopic cameras 50, 52 from the case 14 and substitute their output of for those of the multimedia device's local camera.

FIGS. 7 and 8 illustrate an alternate embodiment of case 14 with embedded microphones 60 in the sides and ends of case 14. This embodiment allows for earphone microphones 18a, 18b to be omitted. The user would only require case 14 to produce high quality recordings, and no headphones or external microphones would be needed. Embedded microphones 60 could be located on opposing sides of case 14, at opposing ends of case 14, or on the back of case 14, and codec 26 could choose which pair of microphones 60 to employ for recording (or use both pairs) depending on the orientation of the phone. Additionally, digital signal processing could be added to individual microphones 60 to enhance the recording effect. The digital signal processing could include filtering, dynamic delay, mid side decode, variable phase inversion, compression, limiting, beam-forming, HRTF filters, or any other digital signal processing technology. A mobile smart phone application could also be employed to remotely control the optional digital signal processing functionality within the codec, allowing you to change equalizer settings, filters, effects, recording levels, and any other digital signal processing function that is being utilized. Microphones 60 are also visible in previous embodiments. It should be noted that microphones 60 can be embedded anywhere on case 14 without departing from the scope of the invention.

In operation, (playing earphones only from recorded audio) the digital audio output signal from the multimedia device 12 passes through the male and female pin connectors (23, 25) and is routed via hard wires to the codec's 26 digital/analog converter 44 where it is converted to an analog signal, and with no further processing required, routes the audio signals via the tip ring sleeve connector style jack 17 through input jack input hole 28, which then sends a positive and negative left and right signal to the earphones 16 where the audio signal is converted to sound.

In operation, (playing amplified direct audio from the microphones) codec 26 may amplify and process analog audio signals it receives from both microphones 18a, 20a, bypass the analog/digital convertor and directly output the analog audio signal to speakers 18b, 20b in conjunction with audio signals from device 12 that it has converted from digital to analog and also simultaneously provided to the earphones 16. This feature is especially useful to individuals that are hearing impaired. It also lends itself to karaoke.

In operation (recording stereo sound only) when sound is captured by microphones 18a, 20a the analog input audio signal travels via jack 17 through input hole 28 to codec 26 where preamp 40 amplifies the signal. Next the analog/digital convertor converts the analog signal to a digital signal and the now digital signal passes through the male connector 23 to female connector 25 into multimedia device 12 for recording. Codec 26 can optionally employ a digital signal processor 43 for additional processing prior to recording.

The Codec can convert digital audio signals to analog audio signals with the D/A convertor 45, or convert analog audio signals to digital audio signals with the A/D convertor 42 and thus can process digital signals regardless of whether they are to be recorded, or played through the audio speakers 18b and 20b in a processed or non-processed state, and regardless whether they are coming directly from the microphones 18a and 20a or the multimedia device 12. Thus, users have the option to process the audio signal before recording, upon payback from its recording or both.

The speaker input and the microphone output are analog but the input to and output from the multimedia device are digital. For this reason, the codec has digital to analog converters and analog to digital converters. In operation, the codec signal to the multimedia device is always digital, regardless of whether it is sending or receiving data. The same hard wire digital interface between the codec and the multimedia device transmits parasitic power from the multimedia device and then via the power distribution module, portions out this power from the battery in the multimedia device to run the codec, microphones and speakers. This is accomplished operational connection via the various six (or seven) conductors of the aforementioned jack 17.

It is to be noted that current operating systems (such as the Apple IOS) have standards (guidelines and protocol) for supported codecs, wiring and identification of the codec unit. One of these standards function to tell the multimedia device to override its mono microphone system and substitute the stereo microphone input as discussed above. It also integrates with the operational software program of the multimedia device such that the volume control of the speakers can be adjusted from the phone or the dongle.

There is an application program available for the multimedia device that may be downloaded into the multimedia device's memory that allows the multimedia device to control of the processing functions of the codec.

The codec has an algorithm for the automatic adjustment of the recording microphone level. When connected to the multimedia device, the codec is an extension of the multimedia device except that the multimedia device's operating system lacks an application or any instructions of how to operate the dual stereo microphone (i.e. to adjust the recording levels). There is a downloadable application for the multimedia device that allows the multimedia device to control the processing functions of the codec (such as equalization). Se functions may also be controlled via the assignable switches discussed herein, Additionally, certain basic functionalities (such as volume control native to the operating system) is integrated with the visual display of the multimedia device so as to allow the multimedia to control the processing functions in the codec through the visual display of the multimedia device.

In operation, (recording stereo sound synchronized with video recording) the multimedia device's video recording feature is deployed from the interface screen on the multimedia device which signals the internal camera to begin recording simultaneously with the initiation of a "record now" signal to the multimedia devices internal mono-microphone. Since the microphones are electrically connected to the codec (pre-amp 138, optional amp 40, digital signal processor 43 and analog to digital converter 42) and the codec is connected to the multimedia device through the male and female pin connectors, the multimedia device's logic controller (internal microprocessor) recognizes the existence of a connected, alternate set of stereo microphones from an identification code that the codec has. This identification code tells the multimedia device that it is connected to a USB digital audio device with stereo capabilities which signals the multimedia device's recording app to utilize the stereo microphones rather than the mono microphone unit of the multimedia device for recording. (A stereo audio input always overrides and replaces a mono audio input in the hierarchy of recording setting rules.)

The "record now" signal is routed through the male and female multi pin interface connector through the codec to the microphones to begin recording. Phantom power is initiated to the microphones. The microphone's output signal passes through the tip ring sleeve connector style jack 17 and the headphone jack input hole 28 then via the hard wires to the codec where it sequentially passes through the pre-amplifier, the digital signal processor and the digital/analog convertor. Eventually, after sound processing, a set of left and right digital audio signals are set via hard wires to the male and female multi pin interface connector and into the multimedia device's digital memory where it is stored in synchronization with the video images.

Turning to FIGS. 10-17 *a*, circumaural (around-the-ear) audio headphone embodiment 70 is illustrated. Headphones 70 house the codec 26 allowing headphones 70 to be connected directly to multimedia device 12 or any other audio source. Headphones 70 comprise a left-ear assembly 72, left-ear cup 72a, left headphone speaker 72b, left-ear microphone unit 72d, right-ear assembly 74, right-ear cup 74a, right headphone speaker 74b, and right-ear microphone unit 74d. Microphones 72d, 74d are outward facing (face away from the head of the user) and lie along the centerline of the ear canal, when placed over the user's ear. Microphones 72d, 74d are non-directional, capturing sound from all directions, partially limited only by any physical barriers. Thus, microphones 72d, 74d are positioned to collect the exact same sound that would go into the ear canal, as the ear canals would capture without headphones. In this way the sound origin, direction, volume, frequencies, tonal response, etc., as captured by microphones 72d, 74d will most closely approximate the sound collected by the users' ears at the time of a recording, essentially mimicking a Head Related Transfer Function (HRTF). Flexible and adjustable headband 75 connects left-ear assembly 72 and right-ear assembly 74. When reproduced, this audio recording will closely mimic the original source (of the audio waves being captured). Left-ear pad 72e and right-ear pad 74e provide a comfort fit to the user. A battery (rechargeable, low energy power consumption) is embedded in right-ear cup 74a, and digital cable connection 76 allows for recharging of the battery and can also carry both playback of audio recordings and capture data (audio recordings) in one stream. A mini-SD slot 78 allows a user to insert a mini-SD card to transfer data. Memory could also be permanently embedded in right-ear assembly 74 (or left-ear assembly 72). Orifice 80 is a 3.5 mm analog headphone jack. Second orifice 82 is an analog microphone output to connect to a Video recorder, such as a GoPro®. Having both digital (76) and analog connections (80, 82) provides the most flexibility to the user.

Easy controls allow the user to control the functionality of headphones 70. For example, one possible arrangement could have button 84 as the power button. Button 86 allows the user to toggle through four different level settings (low to high) and a fifth auto-setting. A right-side series of LEDs 88 serves as a visual indicator of the of the input and output levels from microphone 74d, and left-side LEDs 90 serves as a visual indicator of the of the input and output levels from microphone 72d. Button 92 is a one-touch record button, wherein the user can press button 92 to initiate recording, and hold button 92 for once second to end recording, and button 94 could initiate Bluetooth® pairing.

Headphones 70 can record stereo sound and deliver stereo music wirelessly from any Bluetooth enabled ready device. The user can easily pair headphones 70 to a smartphone, tablet, computer, and television to enjoy music that is reproduced with all of the details and clarity of the original sound.

An alternate circumaural (around-the-ear) audio headphone embodiment 70 is powered and similar to previously discussed embodiments. Microphone units 72d and 74d are powered through "phantom power" and the hardwiring of headphones 70 would utilize six conductors—three conductors per side. Microphones 72d, 74d input signal is processed first by codec 26 prior to being transmitted to another device or transmitted to permanent memory embedded in headphones 70, or to a mini-SD card.

Additionally, digital signal processing could be added to this embodiment's audio codec to enhance the recording effect. The digital signal processing could include filtering, dynamic delay, mid side decode, variable phase inversion, compression, limiting, beam-forming, HRTF filters, or any other digital signal processing technology. A mobile smart phone application could also be employed to remotely control the optional digital signal processing functionality within the codec, allowing you to change equalization settings, filters, effects, recording levels, and any other digital signal processing function that is being utilized.

FIGS. 18-21 illustrate a third embodiment binaural recording and playback device 110 of the present invention includes earbud-style earphones 16 and dongle 112. Dongle 112 replaces case 14 of the first embodiment binaural recording and playback device 10. Other than its cable wired connection to the multimedia device and its preferred embodiment's lack of a battery, it operates the same way as the case embodiment.

Generally, the dongle 112 is connected to the earphones 16 by an analog cable 130/132 and connected to the multimedia device by a digital cable 134. Earphone jack input hole (not visible but operating the same as headphone jack input hole 28) is incorporated into dongle 112, and is adapted to receive earphone jack 17. It is also matingly conformed for proper electrical connection with the various six (or seven) conductors of the aforementioned jack 17. The input jack moves analog audio signals both ways—by reception and transmission. Transmission occurs when sound/music is played through the earphones 16, simultaneous with phantom power being provided to the microphone units 18a and 20a. Reception occurs when microphones 18a, 20a are recording. Jack 17 can be hardwired to the dongle, or it could easily be detached to allow for an alternate audio signal input. Such other audio signal inputs may be electric musical instruments, or stereos.

Connector 114 allows digital signal transmission cable 134 from the dongle 112 to connect to multimedia device 12. Dongle 112 houses the identical codec 26 as in the case. The dongle 112 may house an optional battery 22, as in the alternate embodiment of FIGS. 18 and 20, although the preferred embodiment does not. Similar to the case embodiment, when there is a battery, there will be a power management module 100 in the codec. Switch 150 allows the user to determine which of these three power usage modes of the battery they want the power management module to use. When the power management module directs all power to the multimedia device 12, the codec and earphones 16 draw their operational power parasitically from the connected multimedia device.

Since the dongle resides in line between the earphones and the multimedia device it is preferred to have as small, light physical profile as possible that can easily hang off of the earphones without dislodging them from the user's ears. Without the battery, the codec 26 is operatively powered by the attached multimedia device. Buttons 116, 118, 140 and 142 are assignable controls and may be depressible or rocker style switches that control such features as power on/off, record or playback modes, volume levels, track skip, and the like. The sensitivities of the two recording microphones may be assigned to these buttons so as to enable control over the stereo low recording level interlock instruction set. There may be numerous other tactile switches incorporated into the dongle. These switches may also have multiple functions assigned through the microprocessor and accessed through multiple sequential actuation of each switch. An optional right-side series of LEDs 122 serves as a visual indicator of the of the input and output levels from microphone 20a, and left-side LEDs 120 serve as a visual indicator of the of the input and output levels from microphone 18a.

Where digital signal processing is added to individual device 110's audio codec to enhance the recording effect, the dongle would be too small to house these controls. The digital signal processing may include filtering, dynamic delay, mid side decode, variable phase inversion, compression, limiting, beam-forming, HRTF filters, or any other digital signal processing technology. Here the multimedia device (generally a mobile smart phone) is employed to remotely control the optional digital signal processing functionality within the codec, allowing the changing of equalization settings, filters, effects, recording levels, and any other digital signal processing function that is being utilized. There is a downloadable software application that may be incorporated into the multimedia device's memory and operating system to allow for the operation of these digital signal processing features remotely from the tactile display interface of the multimedia device.

The forgoing descriptions are meant to be exemplary only and should not be deemed limiting. While certain features and aspects have been described with respect to exemplary embodiments, one skilled in the art will recognize that numerous modifications are possible. System components described according to a particular structural architecture and/or with respect to one embodiment may be organized in alternative structural architectures and/or incorporated within other described embodiments. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

I claim:

1. An accessory for binaural recording and playback for a multimedia device comprising:
    a headphone, said headphone having a left ear piece that houses an inwardly facing left speaker and an outwardly facing, left, non-directional recording microphone therein and a right ear piece that houses an inwardly facing right speaker and an outwardly facing, right, non-directional recording microphone therein;
    a dongle, said dongle having a microprocessor and a memory;
    an audio codec housed in said dongle and in communication with said microprocessor, said audio codec having audio signal processing functionality accomplished through components selected from the group consisting of microphone preamplifiers, microphone amplifiers, analog audio signal to digital audio signal convertors, digital audio signal processors, and digital audio signal to analog audio signal convertors;
    an application program in said memory, executed by said microprocessor, communicating an operating system of said multimedia device to allow a video interface of said multimedia device to operate said audio signal processing functionality of said audio codec in said dongle;
    a right three-conductor-wire analog transmission cable connected between said dongle and said right ear piece;
    a left three-conductor-wire analog transmission cable connected between said dongle and said left ear piece;
    a digital signal transmission cable operatively connected at a first end to said dongle, and configured at a second end for connection to a multimedia device;
    wherein said audio codec is in communication with said headphone, and operatively powered by said multimedia device when connected;
    wherein said dongle is a parasitically powered dongle without its own power source, receiving said parasitic power from said multimedia device when connected; and
    wherein said right, non-directional recording microphone and said left, non-directional recording microphone receive sound and transmit an audio signal to said mutimedia device through said audio codec.

2. The accessory for binaural recording and playback for a multimedia device of claim 1,
    wherein said right three-conductor-wire analog transmission cable has a common neutral wire connected to said inwardly facing right speaker and said outwardly facing, right, non-directional recording microphone; and a right microphone signal wire and a right speaker signal wire; and
    wherein said left three-conductor-wire analog transmission cable has a common neutral wire connected to said inwardly facing left speaker and said outwardly facing, left, non-directional recording microphone, and a left microphone signal wire and a left speaker signal wire.

3. The accessory for binaural recording and playback for a multimedia device of claim 1,
    wherein said audio codec has a recording level interlock circuit, a digital to analog signal converter, a digital signal processor, an analog to digital signal processor and a microphone amplifier.

4. The accessory for binaural recording and playback for a multimedia device of claim 3 further comprising a video signal processor integrated into said audio codec.

5. The accessory for binaural recording and playback for a multimedia device of claim 3 further comprising a power management module integrated into said audio codec.

6. The accessory for binaural recording and playback for a multimedia device of claim 3 wherein said outwardly facing, right, non-directional recording microphone and said outwardly facing, left, non-directional recording microphone are positioned along the centerline of an ear canal when said earphones are worn.

7. The accessory for binaural recording and playback for a multimedia device of claim 6 further comprising:
    a series of left microphone recording level light indicators housed on said dongle;
    a series of right microphone recording level light indicators housed on said dongle;
    a first switch on said dongle for an adjustment of a right microphone sensitivity;
    a second switch on said dongle for an adjustment of a left microphone sensitivity;
    wherein said first switch and said second switch may be adjusted upward or downward to overcome a low recording level interlock and insure a proper recording level and stereo separation of a recorded signal.

8. The accessory for binaural recording and playback for a multimedia device of claim 7 comprising:
    a power management module integrated into said microprocessor; said power management module adapted for the allocation of power between said multimedia device, said dongle and said left ear piece and said right ear piece.

9. The accessory for binaural recording and playback for a multimedia device of claim 7 further comprising embedded memory for capturing recorded audio data from said outwardly facing, left, non-directional recording microphone and said outwardly facing, right, non-directional recording microphone.

10. The accessory for binaural recording and playback for a multimedia device of claim 7 further comprising removable memory for capturing recorded audio data from said outwardly facing, left, non-directional recording microphone and said outwardly facing, right, non-directional recording microphone.

11. An accessory for binaural recording and playback for a multimedia device comprising:
    a headphone, said headphone having a left ear piece that houses an inwardly facing left speaker and an outwardly facing, left, non-directional recording microphone therein and a right ear piece that houses an inwardly facing right speaker and an outwardly facing, right, non-directional recording microphone therein;

a dongle, said dongle having a microprocessor and a memory;

an audio codec housed in said dongle and in communication with said microprocessor, said audio codec having audio signal processing functionality accomplished through components selected from the group consisting of microphone preamplifiers, microphone amplifiers, analog audio signal to digital audio signal convertors, digital audio signal processors, and digital audio signal to analog audio signal convertors;

an application program in said memory, executed by said microprocessor, communicating an operating system of said multimedia device to allow a video interface of said multimedia device to operate said audio signal processing functionality of said audio codec in said dongle;

an analog transmission cable connected between said dongle and said right ear piece;

an analog transmission cable connected between said dongle and said left ear piece;

a digital signal transmission cable operatively connected at a first end to said dongle, and configured at a second end for connection to a multimedia device;

wherein said audio codec is in communication with said headphone, and operatively powered by said multimedia device when connected;

wherein said dongle is a parasitically powered dongle without its own power source, receiving said parasitic power from said multimedia device when connected; and wherein said right, non-directional recording microphone and said left, non-directional recording microphone receive sound and transmit an audio signal to said multimedia device through said audio codec.

* * * * *

UNITED STATES PATENT AND TRADEMARK OFFICE
CERTIFICATE OF CORRECTION

Page 1 of 1

PATENT NO. : 10,171,903 B2
APPLICATION NO. : 15/860549
DATED : January 1, 2019
INVENTOR(S) : Matthew Marrin It is certified that error appears in the above-identified patent and that said Letters Patent is hereby corrected as shown below:

On the Title Page

(63) Related U.S. Application Data:
Please remove: Continuation-in-part of application No. 14/272,635 filed on May 8, 2014, now abandoned.
Please insert: --Continuation-in-part of application No. 14/715,238, filed on May 18, 2015, now abandoned which is a continuation-in-part of application No. 14/272,635 filed on May 8, 2014, now abandoned.--

Signed and Sealed this
Twenty-eighth Day of January, 2020

Andrei Iancu
*Director of the United States Patent and Trademark Office*